Patented June 5, 1945

2,377,639

UNITED STATES PATENT OFFICE 2,377,639

SOIL STABILIZATION

Abraham B. Miller, deceased, late of Newark, Del., by Hazel E. Miller, administratrix, Newark, Del., assignor to Hercules Powder Company, Wilmington, Del., a corporation of Delaware No Drawing. Application August 10, 1942, Serial No. 454,292

8 Claims. (Cl. 106—238)

This invention relates to soil stabilization, and more particularly to stabilizing soil by mixing therewith a saponified, substantially petroleum-hydrocarbon insoluble pine wood resin.

Soil stabilization is a treatment of soils, especially road soils, so that they are more suitable as road building materials. In doing this, natural deficiencies of the soil are corrected. For example, in the case of some road soils, poor load-bearing qualities are taken care of. In the case of other road soils which have poor moisture resistance, they are stabilized to prevent rutting, frost heaving, and other phenomena associated with weakening of the road by water.

Heretofore, it has been proposed to stabilize soil by blending soils of various particle sizes and physical and chemical properties. For example, one type of soil may give strength and hardness for resisting abrasive action of traffic, while another may provide for interlocking of the soil grains and give and increase in shear strength. Then there should be enough clay-like material in the blend present to absorb water and maintain stability in dry weather. Silt might be desired to act as a filler and give a capillary bond in the presence of water when the clay present becomes weak by losing cohesion in wet weather. The difficulty with this method of stabilization is that in grading and selecting and blending the quantities of various types of road materials, an enormous volume of materials must be handled.

The stabilization of soil has been proposed through the addition of deliquescent materials to assist in maintaining the desired water content, to prevent dusting, and to prevent the roads from becoming muddy in wet weather. Also, water-soluble binders such as sulfite liquor concentrate and distillery wastes have been proposed. Likewise, bituminous emulsions have found some application for stabilizing road soil.

Now in accordance with this invention it has been found that soil can be stabilized by mixing therewith a small quantity of powdered, saponified, substantially petroleum hydrocarbon-insoluble pine wood resin added dry or in water. The soils may or may not be adjusted first with the necessary aggregate or soil fines, to bring the soil to recognized mechanical analysis for optimum strength and serviceability.

The term "soil" hereinbefore referred to means natural earthy decomposition products of rocks which may be suitable for building roads, and the like, and which are characterized chiefly by having a certain amount of binding quality when they are packed at optimum moisture and dried. This binding quality is due to the more or less chemically active silts and clays present or rock fines such as, finely pulverized lime-rock or caliche which also contributes this property.

The term "substantially petroleum hydrocarbon-insoluble pine wood resin" hereinbefore referred to is a resinous material which may be prepared from pine wood, preferably from stump pine wood and which comprises the resinous residue remaining after separation of the rosin from the total resinous extract of the wood. Thus, the pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired, such as with use of other solvents for extracting the total resin content from the wood. The resin may be defoamed by steaming or heat treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocarbons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C., and a non-carboxylic hydroxyl content of about 5 to about 9 percent. The above defined resin is hereinafter referred to simply as "pine wood resin."

In carrying out the invention, any suitable soap of the pine wood resin may be employed, such as sodium soap, potassium soap, and ammonium soap. These soaps may be employed in solution or dry form directly or may be employed in the form of a dry or paste size, in solution if desired, containing predominant amounts of the saponified pine wood resin. The paste saponified pine wood resin should not exceed 30% of free resin as the free resin introduces difficulties in mixing with the soil which makes the material unsatisfactory.

To establish the stabilizing activity of saponified pine wood resin, a laboratory method has been developed which gives an indication of the stabilizing activity which may be expected of the material in the field. It is verified by sufficient field experience to be used for making recommendations as to the amount of stabilizer to be used in field construction. The extent of packing the soil samples by the laboratory method is accurately controlled as well as the moisture in the samples at the time of packing. The samples are cured uniformly and tested with a capillary rise test which gives information as to the tendency of the soil to pick up water from a wet sub-grade when the soil is used for construction purposes. These capillary rise tests are run for only 24 hours since the dominant portion of the moisture pickup occurs during this period. The allowable moisture pickup is that required to bring the sample to ¾ optimum moisture which is based on the principle that if the soil does not increase in moisture content over ¾ optimum under adverse moisture conditions, it will continue to give adequate bearing capacity and satisfactory service.

The laboratory method utilizes a sand tamper such as is the standard in the foundry industry. A quantity of soil is tamped in a cylindrical mold to form a cylinder of soil 2 inches in diameter and slightly over 1½ inches high. This mold is constructed so that instead of having a firm bottom, it rides on a false bottom which in its movement contributes packing on the bottom of the sample while the top is being tamped. After 10 tamps are delivered to the top of the sample, the mold is reversed and the bottom of the sample is also given 10 tamps, thereby providing a uniformity of packing not otherwise achieved. By means of a registering plunger, the sample is then moved in the mold so that any excess over the 1½ inch height projects above the top of the mold and can be struck off. This is done for the purpose of obtaining a series of samples exactly 1½ inches high. Work with this equipment has established that it is preferable to tamp samples containing pine wood resin-type stabilizer at about 90% of optimum moisture as determined by standard equipment (see A. S. T. M. Designation: D558-40T). With tamping at this slightly low moisture content, there would be a tendency for the sample to show slightly lower density than that obtainable at optimum moisture. To obtain specimens having a density equivalent to maximum density, an extra weight is placed on the standard foundry sand rammer to increase the tamping force.

After a series of samples with varying amounts of stabilizer is prepared, they are allowed to dry back to 60% of optimum moisture in a pan over water. After the samples have gone through this curing and drying preiod, they are placed in ¼ inch of water for a period of 24 hours in a pan with a tight lid and are then reweighed to determine the moisture pickup. These figures are reported alongside a figure of the amount of moisture which that particular sample will have to pick up to reach ¾ of optimum moisture. If the figure of moisture pickup is less than that required to bring the sample to ¾ optimum moisture, sufficient stabilizer is considered to be present for field proportioning and construction.

The following examples illustrate several ways in which the principle of the invention has been demonstrated, but are not to be construed as limiting the same.

EXAMPLE 1

A non-plastic soil 100% of which passed a #10 mesh sieve, comprising by weight, sand, 63.9%; silt,13.7%; clay, 22.4%; and having the following soil constants: Liquid limit, 16; plasticity index, 3; was classified as a Public Roads Administration Class A-2 non-plastic soil. Specimens 2 inches in diameter and 1½ inches high were made from this soil compacted to standard density and using different quantities of the saponified pine wood resin. These results are shown in Table 1 as following:

TABLE 1

*Capillary rise test*

| | Type soil A-2 non-plastic | Opt. moisture 13.5% | | | Density, 114 lbs./cu. ft., moisture pickup to give ¾ opt. moisture |
|---|---|---|---|---|---|
| No. | Stabilizer | Method of introduction | Stab. | Moisture pickup in 24 hours | |
| | | | Per cent | | |
| 1 | No stabilizer | | 0.0 | 10.1 | 2.6 |
| 2 | Pine wood resin | Alk. slurry | 1.2 | 2.7 | 2.6 |
| 3 | Pine wood resin sodium dry size | Dry | 0.8 | 1.9 | 2.8 |
| 4 | Pine wood resin size (60% solids) | Thinned with warm water | 0.8 | 1.5 | 2.9 |

EXAMPLE 2

A very plastic soil 100% of which passed a #10 mesh sieve, comprising by weight, sand, 37.7%; silt, 29.2%; clay, 33.1%; and having the following soil constants: Liquid limit, 27; plasticity index, 19; was classified as a Public Roads Administration Class A-7 very plastic soil. Specimens were prepared similar to Example 1 above and the results are shown in Table 2 following:

TABLE 2
*Capillary rise test*

| Type soil A-7 very plastic clay | | | Opt. moisture 19.0% | | Density 104 lbs./cu. ft., moisture pickup to give ¾ opt. moisture |
|---|---|---|---|---|---|
| No. | Stabilizer | Method of introduction | Stab. | Moisture pickup in 24 hours | |
| | | | *Per cent* | | |
| 1 | No stabilizer | | 0.0 | 11.0 | 3.9 |
| 2 | Pine wood resin | Alk. slurry | 2.1 | 6.5 | 3.9 |
| 3 | Pine wood resin sodium dry size | Dry | 1.3 | 6.0 | 3.7 |
| 4 | Pine wood resin size (60% solids) | Thinned with warm water | 1.3 | 3.4 | 5.1 |

The above examples show that saponified pine wood resin can be readily mixed with soil and provides good soil stabilization.

For practical application of saponified pine wood resin and soil, the soil to be stabilized is first graded in the customary manner. If it is very wet, the soil is preferably first dried back to a moisture content well below optimum moisture for "sheepsfoot" roller compaction. It is important also that the subgrade below the road being stabilized is sufficiently low in moisture content that such drying of the material to be stabilized can be achieved in a reasonable time.

The saponified pine wood resin, if in the form of a dry powder, may be spread by hand from evenly spaced bags placed alongside the road being stabilized or from a mechanical appliance such as a lime spreader which gives uniform application on the road. In the case of the paste soap, it may be applied from a sprinkler wagon in which preferably a portion of the water used has been heated by means such as boilers used in warming up asphalt tank cars before unloading. The sprinkler wagon should be equipped with a centrifugal pump for assisting in dissolving the soap and applying the solution uniformly to the road.

In mixing the soaps of the pine wood resin in the roads, common practice is to first pulverize thoroughly the road soil by means of scarifiers, motor patrol graders, and harrows. Upon this pulverized material, the powdered pine wood resin soap is uniformly spread by hand or mechanical means, then mixed thoroughly by harrows and plows into the road soil. After this mixing has been accomplished, the moisture content of the road is brought up to the neighborhood of optimum moisture for packing. It is preferable, where the nature of the soil permits, that the packing be done on the dry side of optimum moisture, for example, at a moisture content of between 85-90% of optimum moisture. If packing must be done at optimum moisture, the road should not be primed until the stabilized soil has dried down to at least 70-80% of optimum moisture. In a sandy soil it appears desirable to dry down to 50-60% of optimum moisture.

If the paste soap of the pine wood resin is used or the dry size applied in a water solution, it may frequently happen that the amount of water in the soil will exceed optimum moisture or at least exceed 85-90% of optimum moisture at which it is preferable to compact a soil. In such case, it is recommended that the soil be aerated until the moisture content drops to the desired quantity before packing and that it is not higher than 70-80% of optimum when primed. Another practice of mixing the soaps of the pine wood resin in soil to be used as a surface course comprises charging a mixer with the soil and soap of the pine wood resin and thoroughly mixing. Water may be added thereto as desired. The contents of the mixer is then discharged on the sub-grade and suitably packed and finished.

In practicing this invention, between about 0.2% and 5.0% of saponified pine wood resin may be mixed in the soil but preferably between about 0.2% to about 2.0% of saponified pine wood resin will produce good results. Care must be taken in the case of the soaps that the amount of stabilizer does not greatly exceed the amount required for stabilization, otherwise, secondary reactions come into play which detract from the soil stabilizer activity of the soaps and make them function as ordinary water-soluble additive agents.

The resistance to moisture pickup, as illustrated in the above examples, indicates that the stabilizing materials clearly improve the resistance of the soil to erosion and gives the constructions formed from stabilized soil better all-around wearing characteristics. These beneficial results can be obtained in a simple, practical and economical manner.

This application is a continuation-in-part of applicant's application for U. S. Letters Patent, Serial No. 361,727 filed October 18, 1940, now U. S. Patent 2,323,929, which is in turn a continuation-in-part of applicant's application for U. S. Letters Patent Serial No. 318,201 filed February 9, 1940, now U. S. Patent 2,323,928.

What is claimed and desired to be protected by Letters Patent is:

1. A stabilized soil having dispersed therein an alkali soap of a substantially petroleum-hydrocarbon insoluble pine wood resin, said soap containing a major proportion of saponified resin.

2. A stabilized soil having dispersed therein a sodium soap of a substantially petroleum-hydrocarbon insoluble pine wood resin, said soap containing a major proportion of saponified resin.

3. A stabilized soil having dispersed therein a potassium soap of a substantially petroleum-hydrocarbon insoluble pine wood resin, said soap containing a major proportion of saponified resin.

4. A stabilized soil having dispersed therein an ammonium soap of a substantially petroleum-hydrocarbon insoluble pine wood resin, said soap containing a major proportion of saponified resin.

5. A stabilized soil having dispersed therein from about 0.2 to about 5 percent by weight of an alkali soap of a substantially petroleum-hydrocarbon insoluble pine wood resin, said soap containing from about 70 to about 100 per cent by weight of saponified resin.

6. A stabilized soil having dispersed therein from about 0.2 to about 5 per cent by weight of a sodium soap of a substantially petroleum-hydrocarbon insoluble pine wood resin, said soap containing from about 70 to about 100 per cent by weight of saponified resin.

7. A stabilized soil having dispersed therein from about 0.2 to about 5 percent by weight of a potassium soap of a substantially petroleum-hydrocarbon insoluble pine wood resin, said soap containing from about 70 to about 100 per cent by weight of saponified resin.

8. A stabilized soil having dispersed therein from about 0.2 to about 5 percent by weight of an ammonium soap of a substantially petroleum-hydrocarbon insoluble pine wood resin, said soap containing from about 70 to about 100 per cent by weight of saponified resin.

HAZEL E. MILLER,
*Administratrix of the Estate of Abraham B. Miller, Deceased.*